J. S. TIPPERY.
POCKET POSTAL SCALE.
APPLICATION FILED FEB. 8, 1909.
931,812.
Patented Aug. 24, 1909.
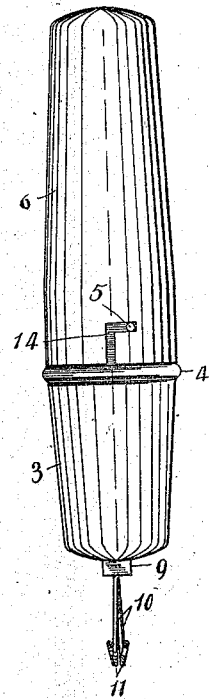
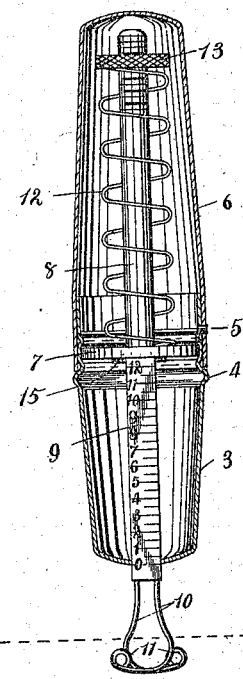
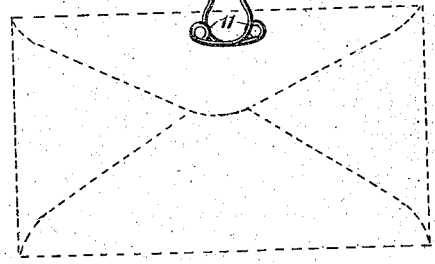

UNITED STATES PATENT OFFICE.

JACOB S. TIPPERY, OF OMAHA, NEBRASKA.

POCKET POSTAL SCALE.

931,812. Specification of Letters Patent. Patented Aug. 24, 1909.

Application filed February 8, 1909. Serial No. 476,692.

*To all whom it may concern:*

Be it known that I, JACOB S. TIPPERY, citizen of the United States, residing at Omaha, in the county of Douglas and State of Nebraska, have invented certain new and useful Improvements in Pocket Postal Scales, of which the following is a specification.

This invention relates to improvements in pocket scales and the especial object of the improvements which form the subject matter of this application is to produce a device of this kind that can be cheaply manufactured, easily carried in the pocket and that will accurately weigh letters and light packages which may be suspended therefrom.

An important object of my invention is to provide means for adjusting the tension of the controlling spring, and to so house the operative parts that they will be protected from injury while being carried in the users' pockets.

In the accompanying drawing I have shown my improved pocket letter weigher on a magnified scale in the following views:—

Figure 1 is an elevation of the scales complete, and Fig. 2 is a vertical cross-sectional view of the scales.

Referring to the details of the drawing, 3 represents the lower member of the tubular casing of the improved scale, and the same is formed from thin metal in the thimble shape shown, with an annular rib 4 near its upper edge, and is provided with a pin 5 extending outwardly at one point. 6 represents the other member of the casing, which is similar in form to member 3 but is somewhat longer and is adapted to fit over the upper end of the latter. An angular slot 14 is formed in the side of the member 6 which is adapted to receive the pin 5 and thus effect a bayonet joint which will interlock the two members 3 and 6 against accidental disconnection.

7 represents an annular washer which is inserted in the member 3 and is held in place by corrugating the walls of the latter on each side of the washer, as clearly shown in Fig. 2. Extending through the round opening in the center of the washer 7, is the weighing rod, the upper portion 8 of which is round in cross-section, while the lower part 9 is square in cross-section and is calibrated in ounces and fractions thereof. The part 9 extends through a suitable opening therefor on the bottom of the casing member 3.

Surrounding the portion 8 of the weigh-rod is a compression coil-spring 12, the lower end of which bears upon the washer 7 and the upper end against an adjustable milled nut 13 which has threaded engagement with suitable threads on the upper portion of the rod 8, thereby permitting adjustment of the nut to increase or diminish the compression of the spring 12. Access to this nut is attained by removing the member 6. The rod portion 8 has an easy sliding fit in the washer 7 and the portion 9 correspondingly slides in the opening in the bottom of the casing member 3, and these two bearings serve to maintain the weigh-rod in its correct weighing position. The pin limits the downward movement of the rod 8.

From the lower end of the weigh-rod extends the letter-clip portion of my invention, and while this feature is capable of many effective constructions for grasping letters and similar articles, the form shown herewith affords a relatively wide frictional bearing on the letter which thereby tends to support it when being weighed. This clip is composed of two complementary members each formed of a piece of spring wire bent to form the stem 10 and a hook terminating in the eye 11. These members are so arranged that their free end portions are in close frictional engagement and the eye of one overlaps the adjacent stem of the other. Furthermore the hooks may have a cord such as is frequently wrapped around a package, suspended therefrom while the latter is being weighed. Where the scales are used on a desk, the form of clip shown will serve as a convenient means for hanging the device on a nail. As the springs of such devices are sensitive to atmospheric conditions, the importance of having means for adjusting the tension of the springs is apparent, and the adjusting nut I have provided while readily accessible, is normally concealed in the casing and cannot be turned accidentally as would be the case if it was exposed.

Having thus described my invention what I claim as new, is:—

1. In a weighing device, a casing composed of two tubular sections adapted to be interlocked, a weigh-bar slidably mounted in said casing and having its lower portion calibrated, a spring arranged in said casing adapted to support said weigh-bar, a washer fixed in said casing and supporting said spring, means for regulating the tension of said spring, and a clip on the calibrated portion of said weigh-bar.

2. In a weighing-device, a casing composed of two separable interlocking tubular sections, a weigh-bar slidably mounted in said casing and having its lower portion calibrated, a spring arranged in said casing and adapted to support said bar, means for supporting said spring, said means to form a guide for said bar, means on said bar for regulating the tension of said spring, and a frictional clip secured to said weigh-bar.

In testimony whereof I affix my signature in the presence of two witnesses.

JACOB S. TIPPERY.

Witnesses:
A. P. PAULSON,
W. K. AYRES.